United States Patent [19]
Shin

[11] Patent Number: 5,886,425
[45] Date of Patent: Mar. 23, 1999

[54] ELECTRONIC PRODUCTS WITH STANDBY POWER SOURCE

[75] Inventor: Ki-Ho Shin, Suwon, Rep. of Korea

[73] Assignee: Samsung Electronics Co., Ltd., Suwon, Rep. of Korea

[21] Appl. No.: 868,618

[22] Filed: Jun. 3, 1997

[30] Foreign Application Priority Data

Nov. 29, 1996 [KR] Rep. of Korea .................. 1996 59940

[51] Int. Cl.⁶ ..................................................... H05K 1/00
[52] U.S. Cl. ............................... 307/66; 307/147; 361/42; 361/760; 439/608; 257/503; 257/725
[58] Field of Search ................................ 307/66, 147, 64; 257/503, 725; 439/608; 361/42, 58, 777, 760

[56] References Cited

U.S. PATENT DOCUMENTS 5,365,407  11/1994  Nakabayashi et al. ................. 439/608
5,449,863   9/1995  Nakatani et al. ...................... 174/250
5,477,407  12/1995  Kobayashi et al. ..................... 361/58
5,671,123   9/1997  Omori et al. .......................... 361/777

*Primary Examiner*—Albert W. Paladini
*Attorney, Agent, or Firm*—Staas & Halsey

[57] ABSTRACT

An electronic product with a standby power source includes a main power circuit for receiving a commercial AC through a power switch and generating a main power source by full-wave rectifying the AC through a diode bridge, and a standby power circuit for receiving the AC and generating the standby power source by full-wave rectifying the AC through another diode bridge, the standby power circuit and the main power circuit being formed on one printed circuit board, and the standby power circuit having an additional ground pattern isolated from a ground pattern of the main power circuit.

7 Claims, 2 Drawing Sheets

ELECTRONIC PRODUCTS WITH STANDBY POWER SOURCE

BACKGROUND OF THE INVENTION

1. Field of the Invention

The present invention relates to electronic products with a standby power source, and more particularly, to an electronic product with a standby power source which can reduce power consumption during a standby state.

2. Description of the Related Art

Generally, televisions or video cassette recorders for home use utilize a standby power source as well as a main power source according to a tendency toward multifunction and low power. Therefore, during a standby state, the main power source is turned off, and only the smallest number of circuits, for example, a microprocessor having a timer function and a memory circuit, etc., are driven by the standby power source.

FIG. 1 illustrates the construction of a conventional electronic product with such a standby power source. In a main power source circuit 1, a commercial alternating current (AC) 10 received through a power switch 12 is full-wave rectified through a first diode bridge 14, smoothed to a DC voltage through a smoothing capacitor 16, lowered through a main power transformer 18, and generated as various driving voltages necessary for an operation of a circuit through a rectifier circuit including a diode 20 and a capacitor 22. Meanwhile, in a standby power circuit 3, the commercial AC 10 is full-wave rectified through a second diode bridge 22, smoothed to a DC voltage through a smoothing capacitor 24, lowered through an auxiliary power transformer 26, and generated as a standby voltage, 6.5V for example, through a rectifier circuit including a diode 28 and a capacitor 30.

If two diode bridges are formed on the same printed circuit board 4, a ground pattern is shared. Therefore, during the standby state, although the power switch 12 is in an off state, a main power source is generated during a negative cycle of the AC by forming a current path through the first diode bridge 14, the smoothing capacitor 16, the common ground pattern and the second diode bridge 22. Consequently, unnecessary power is consumed.

SUMMARY OF THE INVENTION

It is therefore an object of the present invention to provide an electronic product with a standby power source which can prevent unnecessary power consumption by isolating a ground pattern of a main power circuit from that of a standby power circuit and thus cutting off a current path formed to a main power source during a standby state.

In accordance with one feature of the present invention, an electronic product with a standby power source includes: a main power circuit for receiving a commercial AC through a power switch and generating a main power source by full-wave rectifying the AC through a diode bridge; and a standby power circuit for receiving the AC and generating the standby power source by full-wave rectifying the AC through another diode bridge, the standby power circuit and the main power circuit being formed on one printed circuit board, and the standby power circuit having an additional ground pattern isolated from a ground pattern of the main power circuit.

BRIEF DESCRIPTION OF THE DRAWINGS

The above objects, and other features and advantages of the present invention will become more apparent by describing the preferred embodiment thereof with reference to the accompanying drawings, in which.

DETAILED DESCRIPTION OF PREFERRED EMBODIMENT

Figure 1:
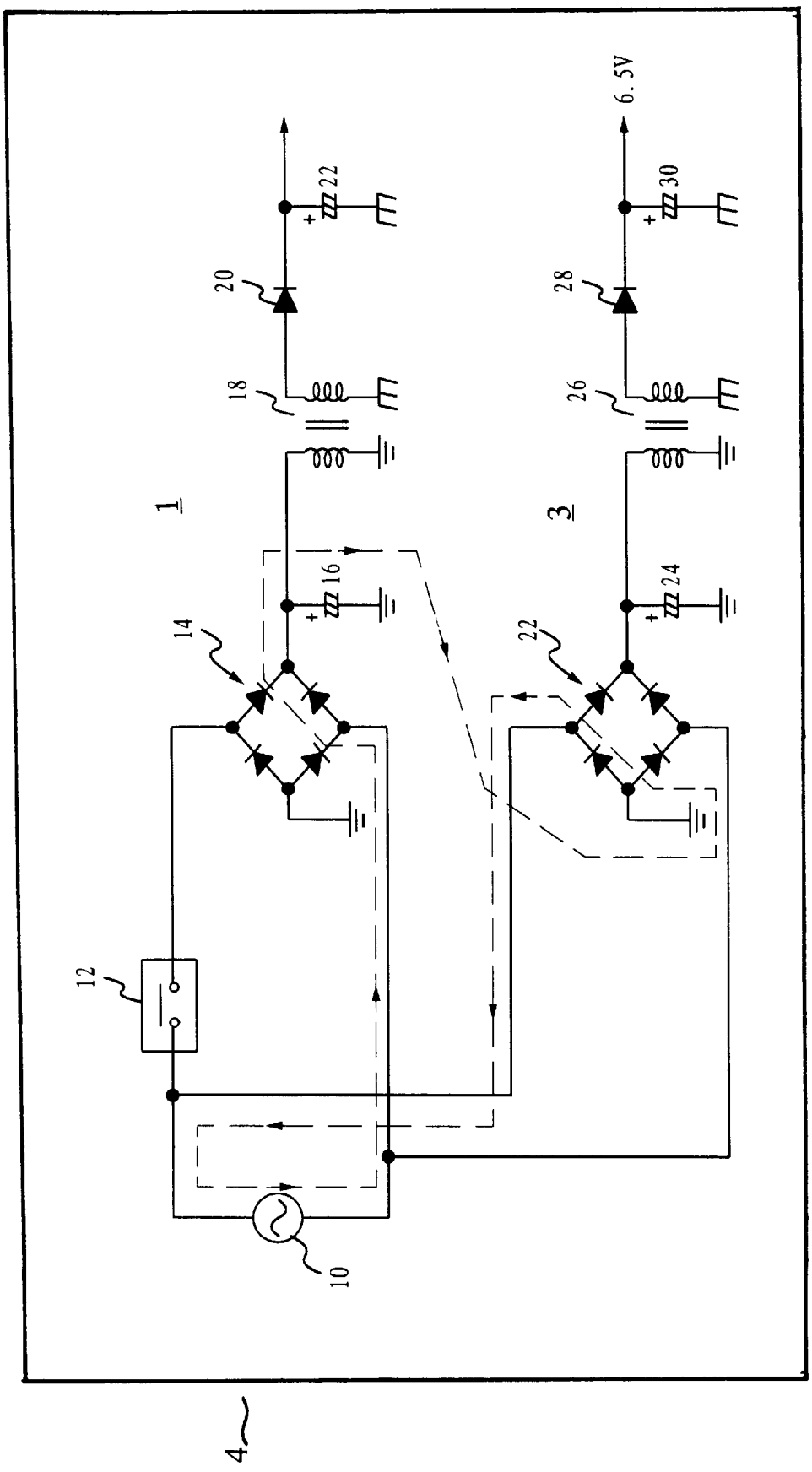
FIG. 1 is a diagram showing the construction of an electronic product with a standby power source according to the prior art.
Figure 2:
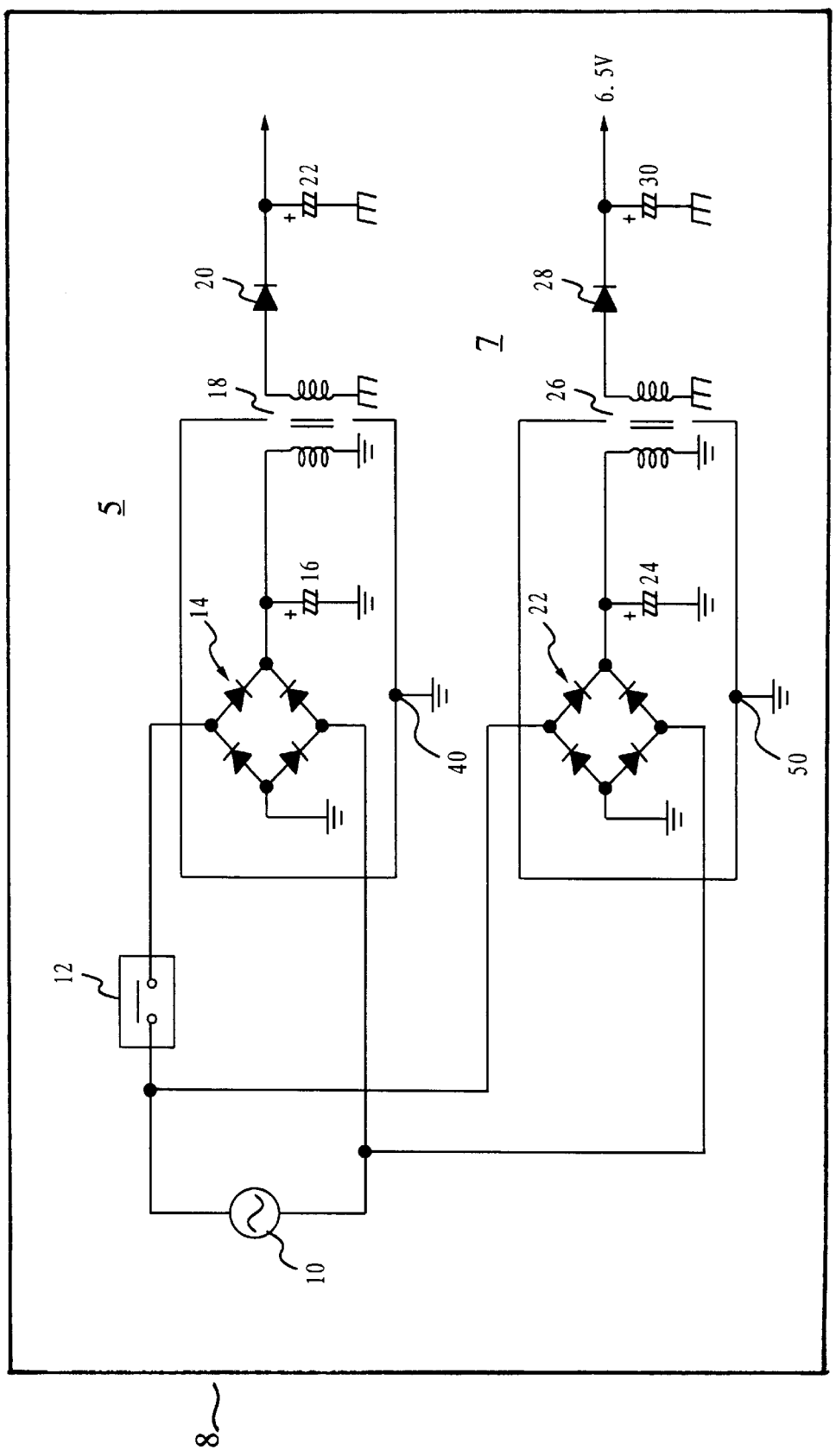
FIG. 2 is a diagram showing the construction of an electronic product with a standby power source according to the present invention.

FIG. 2 shows the construction of an electronic product with a standby power source according to the present invention. A main power circuit 5 and a standby power circuit 7 are formed on the same printed circuit board 8. In the main power source circuit 5, a commercial AC 10 received through a power switch 12 is full-wave rectified through a first diode bridge 14, smoothed to a DC voltage through a smoothing capacitor 16, lowered through a main power transformer 18, and generated as various driving voltages necessary for an operation of a circuit through a rectifier circuit including a diode 20 and a capacitor 22. Meanwhile, in the standby power circuit 7, the commercial AC 10 is full-wave rectified through a second diode bridge 22, smoothed to a DC voltage through a smoothing capacitor 24, lowered through an auxiliary power transformer 26, and generated as a standby voltage, 6.5V for example, through a rectifier circuit including a diode 28 and a capacitor 30. Ground patterns 40 and 50 of the main power circuit 5 and the standby power circuit 7, respectively, are isolated from each other on the one printed circuit board 8.

Therefore, during the standby state, a current path formed to a main power source can be cut off by isolating the ground patterns of the main power circuit 5 and the standby power circuit 7 from each other.

As described above, since the ground patterns of the main power circuit 5 and the standby power circuit 7 each using a diode bridge are isolated, a path to which the main power source is supplied through its ground pattern is cut off during the standby state, and thus the power consumption of the electronic product can be reduced.

What is claimed is:

1. An electronic product for generating a main power source and a standby power source, and having a power switch for alternately enabling transmission of an alternating current (AC), said electronic product comprising:

a main power circuit for receiving said AC, said main power circuit including
the power switch,
a first diode bridge to full-wave rectify said AC to generate a main power source, and
a first ground pattern; and a standby power circuit for receiving said AC, said standby power circuit including
a second diode bridge to full-wave rectify said AC to generate said standby power source, and
a second ground pattern;

wherein said standby power circuit and said main power circuit are formed on one printed circuit board, and said second ground pattern is isolated from said first ground pattern.

2. A device receiving an alternating current (AC) and having a main power state and a standby power state when the main power state is off, said device comprising:

a printed circuit board having both a main power circuit and a standby power circuit;

wherein
said main power circuit includes a first ground pattern and converts said AC to a main power source in the main power state, and
said standby power circuit main power circuit includes a second ground pattern electrically isolated from said first ground pattern and converts said AC to a standby power source in the standby power state.

3. A device as claimed in claim 2, wherein:
said main power circuit further includes
a first diode bridge to full-wave rectify said AC to generate a first rectified voltage,
a first smoothing capacitor to convert said first rectified signal to a first direct current (DC) voltage,
a main power transformer to lower said first DC voltage to a lowered DC voltage, and
a first rectifier to convert said lowered DC voltage to the main power source; and
said standby power circuit further includes
a second diode bridge to full-wave rectify said AC to generate a second rectified voltage,
a second smoothing capacitor to convert said second rectified signal to a second direct current (DC) voltage,
an auxiliary power transformer to lower said second DC voltage to a lowered DC voltage, and
a second rectifier to convert said lowered DC voltage to the standby power source.

4. A device as claimed in claim 3, wherein:
said first rectifier includes
a first diode having an anode connected to said main power transformer and a cathode, and
a first capacitor connected to said cathode of said first diode; and
said second rectifier includes
a second diode having an anode connected to said auxiliary power transformer and a cathode, and
a second capacitor connected to said cathode of said second diode.

5. A device receiving an alternating current (AC), comprising:
a printed circuit board;
a main power circuit formed on said printed circuit board, to convert said AC to a main power source during a main power state of the device, and having a first ground pattern; and
a standby power circuit formed on said printed circuit board, to convert said AC to a standby power source during a standby power state of the device, and having a second ground pattern isolated from said first ground pattern.

6. A device as claimed in claim 5, wherein:
said main power circuit further includes
a first diode bridge to full-wave rectify said AC to generate a first rectified voltage,
a first smoothing capacitor, connected at a first node to said first diode bridge, to convert said first rectified signal to a first direct current (DC) voltage,
a main power transformer, connected to said first node, to lower said first DC voltage to a lowered DC voltage, and
a first rectifier, connected to said main power transformer at a second node, to convert said lowered DC voltage to the main power source; and
said standby power circuit further includes
a second diode bridge to full-wave rectify said AC to generate a second rectified voltage,
a second smoothing capacitor, connected at a third node to said second diode bridge, to convert said second rectified signal to a second direct current (DC) voltage,
an auxiliary power transformer, connected to said third node, to lower said second DC voltage to a lowered DC voltage, and
a second rectifier, connected to said auxiliary power transformer at a fourth node, to convert said lowered DC voltage to the standby power source.

7. A device as claimed in claim 6, wherein:
said first rectifier includes
a first diode having an anode connected to said second node and a cathode, and
a first capacitor connected to said cathode of said first diode; and
said second rectifier includes
a second diode having an anode connected to said fourth node and a cathode, and
a second capacitor connected to said cathode of said second diode.

* * * * *